(12) United States Patent
Wu

(10) Patent No.: US 7,260,026 B1
(45) Date of Patent: Aug. 21, 2007

(54) TIME-OF-DAY TRACKING WITH INS INPUT

(75) Inventor: Yeong-wei A. Wu, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/556,812

(22) Filed: Nov. 6, 2006

(51) Int. Cl.
  *G04C 11/02* (2006.01)
  *G01S 5/02* (2006.01)
  *G01C 21/00* (2006.01)

(52) U.S. Cl. ............. 368/47; 342/357.02; 342/357.14; 701/214; 701/220

(58) Field of Classification Search ............. 368/10, 368/46, 47; 342/357.01, 357.02, 357.12, 342/357, 14; 701/201, 213, 214, 220
See application file for complete search history.

(56) References Cited

U.S. PATENT DOCUMENTS

| | | | | |
|---|---|---|---|---|
| 5,812,087 A * | 9/1998 | Krasner | .................. | 342/357.1 |
| 5,945,944 A * | 8/1999 | Krasner | ................. | 342/357.06 |
| 6,317,688 B1 * | 11/2001 | Bruckner et al. | ........... | 701/213 |
| 6,323,804 B1 * | 11/2001 | Kurby et al. | .......... | 342/357.06 |
| 6,346,911 B1 * | 2/2002 | King | ...................... | 342/357.06 |
| 2003/0011511 A1 * | 1/2003 | King et al. | ............ | 342/357.02 |
| 2003/0187575 A1 * | 10/2003 | King et al. | ................. | 701/213 |

* cited by examiner

Primary Examiner—Vit W. Miska
(74) Attorney, Agent, or Firm—Lee & Hayes, PLLC (57) ABSTRACT

Time-of-day tracking with INS input is described. In one embodiment, a range rate and a range acceleration is generated from inertial navigation system data received from a moveable platform (e.g. an airborne platform). A time and frequency estimation filter receives the range rate, the range acceleration and a timing-based error signal from a time discriminator, and can then generate a time-of-day correction signal and a frequency correction signal. A time-of-day generator receives the time-of-day correction signal and generates a time-of-day correction, and a clock frequency generator receives the frequency correction signal and generates a frequency correction. The time discriminator receives a satellite synchronization signal from a satellite, the time-of-day correction from the time-of-day generator, and the frequency correction from the clock frequency generator. The time discriminator initially generates the timing-based error signal from the satellite synchronization signal, and subsequently generates the timing-based error signal from the time-of-day correction and the frequency correction to synchronize the satellite with the moveable platform.

20 Claims, 4 Drawing Sheets

TIME-OF-DAY TRACKING WITH INS INPUT

STATEMENT OF GOVERNMENT INTEREST

This invention was made with government support under U.S. Government Contract FAB-T F19628-02-C-0048. The U.S. Government has certain rights in this invention.

TECHNICAL FIELD

The present disclosure relates to time-of-day tracking with INS (inertial navigation system) input.

BACKGROUND

Establishing reliable communication between a moving platform, such as an aircraft, and a geosynchronous satellite requires precise synchronization of the moving platforms time-of-day with the satellite time-of-day. Conventional signal filters are problematic because they can typically only synchronize or track the satellite time-of-day when the platform is stationary or moving slowly, and current platforms can not communicate with next generation satellites that transmit higher frequency data signals. Under some circumstances, the moving platforms may be too inaccurate to determine the proper time-of-day of a geosynchronous satellite within an acceptable range of accuracy using prior art systems.

SUMMARY

This summary introduces simplified features and concepts of time-of-day tracking with INS (inertial navigation system) input which are further described below in the Detailed Description. This summary is not intended to identify essential features of the claimed subject matter, nor is it intended for use in determining the scope of the claimed subject matter.

In an embodiment of time-of-day tracking with INS input, a range rate and a range acceleration are generated from inertial navigation system data received from a moving platform, such as an airborne platform, a ground-based platform, a space-based platform, a water-based platform, or a hand-held device. A time and frequency estimation filter receives the range rate, the range acceleration and a timing-based error signal from a time discriminator, and can then generate a time-of-day correction signal and a frequency correction signal. A time-of-day generator receives the time-of-day correction signal and generates a time-of-day correction, and a clock frequency generator receives the frequency correction signal and generates a frequency correction. The time discriminator receives a satellite synchronization signal from a satellite, the time-of-day correction from the time-of-day generator, and the frequency correction from the clock frequency generator. The time discriminator initially generates the timing-based error signal from the satellite synchronization signal, and subsequently generates the timing-based error signal from the time-of-day correction and the frequency correction.

BRIEF DESCRIPTION OF THE DRAWINGS

Embodiments of time-of-day tracking with INS (inertial navigation system) input are described with reference to the following drawings. The same numbers are used throughout the drawings to reference like features and components.

DETAILED DESCRIPTION

Time-of-day tracking with INS (inertial navigation system) input methods and systems are described in which embodiments provide communication between a moveable platform, such as an aircraft, and a geosynchronous satellite. Embodiments of time-of-day tracking with INS input can also be implemented to assist in the synchronization of the time between a moveable platform and a geosynchronous satellite.

In one embodiment, a range rate and a range acceleration can be generated from inertial navigation system (INS) data received from a moveable platform and from satellite ephemeris data stored in a terminal of the moveable platform or received from a geosynchronous satellite. A time and frequency estimation filter can utilize the range rate, the range acceleration and a timing-based error signal to generate a time-of-day correction signal and a frequency correction signal. A time-of-day generator can receive the time-of-day correction signal and generate a time-of-day correction, and a clock frequency generator can receive the frequency correction signal and generate a frequency correction. A timing-based error signal can then be generated from the time-of-day correction and from the frequency correction. The satellite and the moveable platform are then synchronized (precisely and/or approximately) when the time-of-day correction and/or frequency correction achieve maximum signal power, and when the timing-based error signal equals zero.

While features and concepts of the described systems and methods for time-of-day tracking with INS input can be implemented in any number of different environments, systems, and/or other configurations, embodiments of time-of-day tracking with INS input are described in the context of the following exemplary environment and system architectures.

Figure 1:
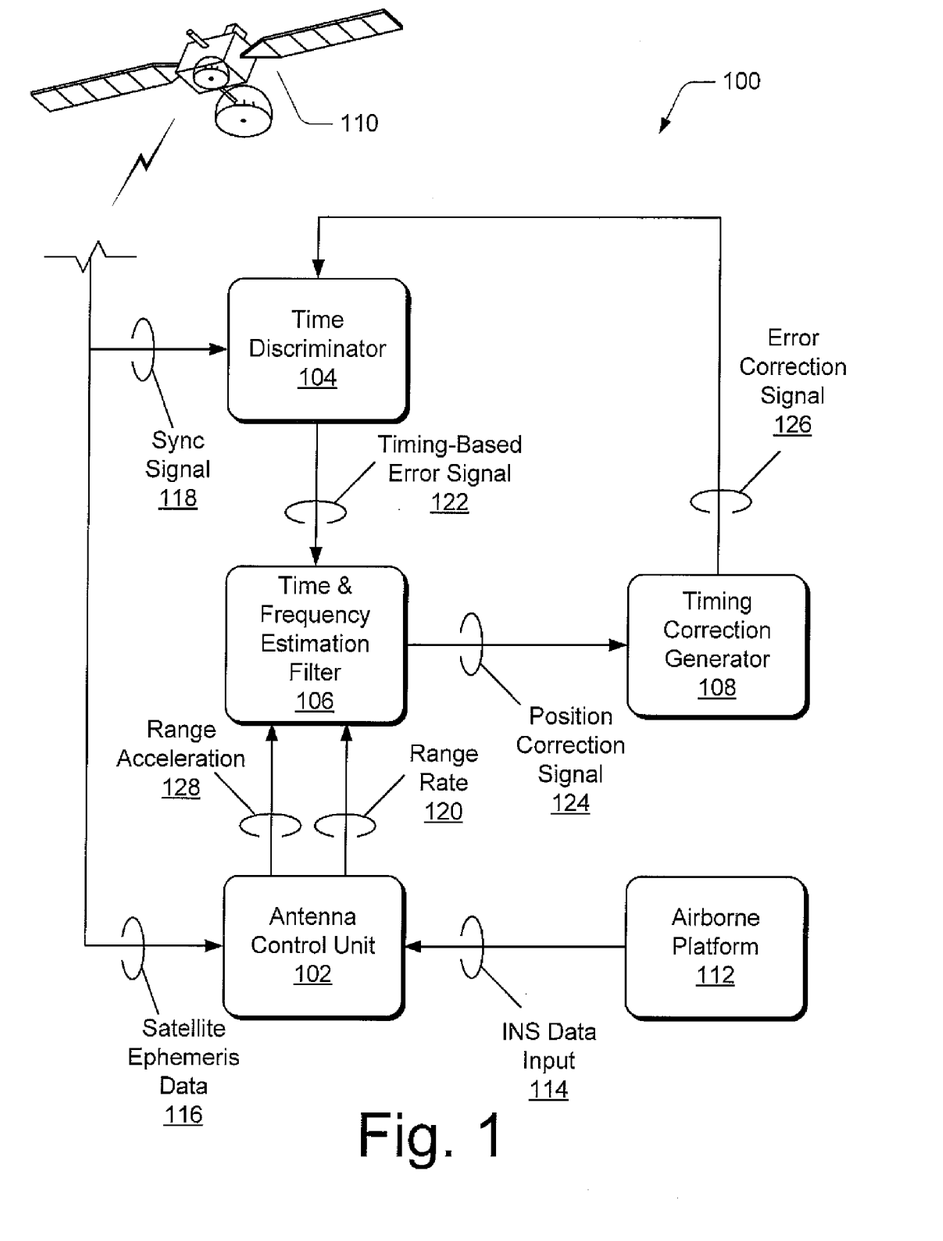
FIG. 1 illustrates an example system in which embodiments of time-of-day tracking with INS input can be implemented.

FIG. 1 illustrates an example time-of-day tracking with INS input system 100 in which embodiments of time-of-day tracking with INS input can be implemented. The system 100 includes an antenna control unit 102, a time discriminator 104, a time and frequency estimation filter 106, and a timing correction generator 108 to synchronize a satellite 110 with an airborne platform 112, such as an aircraft. In this example, the antenna control unit 102 can receive an inertial navigation system (INS) data input 114 from the airborne platform 112 and can receive satellite ephemeris data 116 from the satellite 110. The time discriminator 104 can receive a satellite synchronization signal 118 from the satellite 110.

The antenna control unit 102 can generate a range rate 120 and a range acceleration 128 using the inertial navigation system data input 114 (from the airborne platform 112) and the satellite ephemeris data 116 (from the satellite 110). The inertial navigation system data input 114 received by the antenna control unit 102 may include a position, velocity and motion indication of the airborne platform 112. Similarly, the satellite ephemeris data 116 received from the satellite 110 may include a position, velocity, and acceleration of the satellite 110.

Initially, the time discriminator 104 can receive the satellite synchronization signal 118 from the satellite 110, and generate a timing-based error signal 122 from the satellite synchronization signal. The time and frequency estimation filter 106 can receive the range rate 120 and the range acceleration 128 from the antenna control unit 102 and can receive the timing-based error signal 122 from the time discriminator 104. The time and frequency estimation filter 106 can then generate a position correction signal 124 from the range rate 120 and the range acceleration 128 and the timing-based error signal 122. The timing correction generator 108 can receive the position correction signal 124 and generate an error correction signal 126 that is routed back to the time discriminator 104 which can then generate the timing-based error signal 122 from the error correction signal 126 (and not from the satellite synchronization signal 118). The satellite 110 and the airborne platform 112 are then synchronized (precisely and/or approximately) when the error correction signal 126 achieves maximum signal power and when the timing-based error signal 122 equals approximately zero.

In alternate embodiments, the airborne platform 112 can include one or more of the antenna control unit 102, the time discriminator 104, the time and frequency estimation filter 106, and the timing correction generator 108. Additionally, the airborne platform 112 can include an antenna system to receive the satellite ephemeris data 116 and the satellite synchronization signal 118. In further embodiments, one or more of the antenna control unit 102, the time discriminator 104, the time and frequency estimation filter 106, and the timing correction generator 108 may be stationary or moveable, and may be ground-based, land-based, space-based, water-based, or may be positioned on one or more secondary airborne platforms. In still other embodiments, the airborne platform 112 may be any moveable vehicle (or platform) for which navigational inputs may be desired or required, including ground-based vehicles, land-based vehicles, space-based vehicles, water-based vehicles, or even handheld navigational devices.

A position of the antenna can be based on World Geodetic System (WGS-84) ellipsoidal coordinates latitude, longitude, and height (altitude), and supplied by an antenna reference unit of the airborne platform 112. Satellite position, velocity, and acceleration can be provided in Earth Center Earth Fixed (ECEF) coordinates, XYZ. An Ellipsoid of Revolution in the WGS-84 can be the Earth Model for an algorithm and the antenna reference unit, where:

| a = 6378137; | semi-major axis of ellipsoid in meters |
| f = 3.352810664747e−3; | flattening of ellipsoid. |
| b = a − (f * a); | semi-minor axis of ellipsoid in meters |

Given the antenna latitude, longitude, and height, the antenna XYZ ECEF coordinates can be generated by:

$$\begin{bmatrix} X_{ant} \\ Y_{ant} \\ Z_{ant} \end{bmatrix}_{ECEF} = \begin{bmatrix} (N+h)\cos\psi\cos\lambda \\ (N+h)\cos\psi\sin\lambda \\ \left(\frac{b^2}{a^2}N+h\right)\sin\psi \end{bmatrix}$$

The Satellite calculations can output XYZ in ECEF. When the two points in space are expressed in a common coordinate system, the Line of Sight (LOS) vector in ECEF can be difference between $XYZ_{ant}$ and $XYZ_{satellite}$ or $$\begin{bmatrix} X_{LOS} \\ Y_{LOS} \\ Z_{LOS} \end{bmatrix}_{ECEF} = \begin{bmatrix} X_{satellite} - X_{ant} \\ Y_{satellite} - Y_{ant} \\ Z_{satellite} - Z_{ant} \end{bmatrix}_{ECEF}$$

A range is generated by:

$$\text{Range} = \sqrt{X_{LOS}^2 + Y_{LOS}^2 + Z_{LOS}^2}$$

A normalized LOS vector in ECEF can be generated by:

$$\text{LOS Normalized Vector } ECEF = \begin{bmatrix} X_{LOS} \\ Y_{LOS} \\ Z_{LOS} \end{bmatrix}_{ECEF} \bigg/ \text{Range}$$

The LOS normalized vector in tangent coordinates can be generated by projecting the ECEF normalized vector onto the local tangent east, north, and up axes, where:

$$\text{Tangent East Axis} = \begin{bmatrix} -\sin\lambda \\ \cos\lambda \\ 0 \end{bmatrix}$$

$$\text{Tangent North Axis} = \begin{bmatrix} -\sin\psi\cos\lambda \\ -\sin\psi\sin\lambda \\ \cos\psi \end{bmatrix}$$

$$\text{Tangent Up Axis} = \begin{bmatrix} \cos\psi\cos\lambda \\ \cos\psi\sin\lambda \\ \sin\psi \end{bmatrix}$$

where
$\psi$=latitude antenna
$\lambda$=longitude antenna

The range rate 120 can be generated using the satellite ephemeris data 116 and the inertial navigation system data input 114, where:

Range Rate=Satellite Velocity along LOS−Antenna Velocity along LOS

Satellite Velocity along $LOS =$ $$dot\left([E_{\text{Velocity\_Satellite}} N_{\text{Velocity\_Satellite}} U_{\text{Velocity\_Satellite}}], \begin{bmatrix} E_{\text{LOS\_Normalized}} \\ N_{\text{LOS\_Normalized}} \\ U_{\text{LOS\_Normalized}} \end{bmatrix}\right)$$

Antenna Velocity along $LOS =$ $$dot\left([E_{\text{Velocity\_Antenna}} N_{\text{Velocity\_Antenna}} U_{\text{Velocity\_Antenna}}], \begin{bmatrix} E_{\text{LOS\_Normalized}} \\ N_{\text{LOS\_Normalized}} \\ U_{\text{LOS\_Normalized}} \end{bmatrix}\right).$$

The dot ( ) operation can be a vector dot product, where:

dot( )=row_vector$_{1 \times n}$·column_vector$_{n \times 1}$

The antenna control unit uses the satellite ephemeris data 116 and the inertial navigation system data input 114 to find a line of sight vector in both Earth Center Earth Fixed (ECEF) coordinates and Tangent frame coordinates. The range rate 120 is generated after projecting satellite velocity (east, north, and up) onto the LOS vector in Tangent east, north, and up frame and projecting antenna velocity (east, north, and up) onto the LOS vector in Tangent frame, and taking the difference between the satellite LOS velocity and the antenna LOS velocity. The computations can be determined at 50 Hz. A negative result can indicate that the two points (the Satellite Velocity along LOS and the Antenna Velocity along LOS) are approaching one another. A positive result can indicate that the two points are separating from one another along the LOS.

A similar operation can be performed to determine range acceleration 128, where:

Range Acceleration=Satellite Acceleration along LOS−Antenna Acceleration along LOS Satellite Acceleration along $LOS =$ $$dot\left([E_{\text{Acceler\_Satellite}} N_{\text{Acceler\_Satellite}} U_{\text{Acceler\_Satellite}}], \begin{bmatrix} E_{\text{LOS\_Normalized}} \\ N_{\text{LOS\_Normalized}} \\ U_{\text{LOS\_Normalized}} \end{bmatrix}\right)$$

Antenna Acceleration along $LOS =$ $$dot\left([E_{\text{Acceler\_Antenna}} N_{\text{Acceler\_Antenna}} U_{\text{Acceler\_Antenna}}], \begin{bmatrix} E_{\text{LOS\_Normalized}} \\ N_{\text{LOS\_Normalized}} \\ U_{\text{LOS\_Normalized}} \end{bmatrix}\right)$$

The dot ( ) operation can be a vector dot product, where:

dot( )=row_vector$_{1 \times n}$·column_vector$_{n \times 1}$

The time discriminator 104 can generate the timing based error signal 122 initially using the satellite synchronization signal 118 and subsequently using the error correction signal 126. The time discriminator 104 can advance the satellite synchronization signal 118 half a period and/or delay the satellite synchronization signal 118 half a period to compute the timing-based error signal 122. The time discriminator 104 can use early/late correlation to advance the satellite synchronization signal 118 half a period and/or delay the satellite synchronization signal 118 half a period to compute the timing-based error signal 122. The time discriminator 104 can generate early/late correlation by:

$$E(t_i + \Delta t) = \frac{1}{\Delta t}\int_{t_i}^{t_i+\Delta t} \{\sin(2\pi f_s'(\tau + \tau_d(\tau)))\sin(2\pi \hat{f}_s \tau' + \phi) d\tau\}$$

$$L(t_i + \Delta t) = \frac{1}{\Delta t}\int_{t_i}^{t_i+\Delta t} \{\sin(2\pi f_s'(\tau + \tau_d(\tau)))\sin(2\pi \hat{f}_s \tau' - \phi) d\tau\}$$

where:

$s(t)=\sin(2\pi f_S'(t+\tau_d(t)))$ $$f_s' = f_s + \Delta f_s = f_s + f_s \frac{\dot{R}}{c}$$

$$\tau_d(t) = \frac{R(t)}{c}$$

when s(t) is a satellite synchronization signal, $f_s$ is a satellite synchronization signal frequency, $\dot{R}$ is a range rate, c is the speed of light, $\Delta f_S$ is a doppler drift frequency, and R(t) is a range.

Further, the early/late signals e(t) and l(t) can be defined as $e(t)=\sin(2\pi f_S t'+\phi)$ $l(t)=\sin(2\pi f_S t'-\phi)$ where:

$$\hat{f}_s(t_i) = f_s + \Delta \hat{f}_s(t_i) = f_s + f_s \frac{\dot{R}(t_i)}{c}$$

By carrying out the early/late correlation functions with small time and frequency errors we can obtain:

$E(t_i + \Delta t) =$ $$\frac{1}{2\Delta t}\int_{t_i}^{t_i+\Delta t}\{\cos(2\pi f_s \Delta \tau_d(\tau) - \phi) - \cos(4\pi f_s(\tau + \Delta \tau_d(\tau)) - \phi) d\tau\} \approx$$

$$\frac{1}{2}\cos(2\pi f_s \Delta \tau_d(t_i) - \phi)$$

$L(t_i + \Delta t) =$ $$\frac{1}{2\Delta t}\int_{t_i}^{t_i+\Delta t}\{\cos(2\pi f_s \Delta \tau_d(\tau) + \phi) - \cos(4\pi f_s(\tau + \Delta \tau_d(\tau)) + \phi) d\tau\} \approx$$

$$\frac{1}{2}\cos(2\pi f_s \Delta \tau_d(t_i) + \phi)$$

such that the time discriminator output can be generated by:

$$\frac{E-L}{E+L} \approx \frac{\sin(\phi)\sin(2\pi f_s \Delta \tau_d(t_i))}{\cos(\phi)\cos(2\pi f_s \Delta \tau_d(t_i))} \approx (\tan(\phi)2\pi f_s)\Delta \tau_d(t_i)$$

$$\frac{E-L}{E+L} \approx \tan(\phi) \left\{ \frac{2\pi f_s}{\Delta t} \int_{t_i}^{t_i+\Delta t} \Delta \tau_d(\tau) d\tau \right\}$$

If there is only frequency error applies then:

$$E(t_i + \Delta t') = \frac{1}{\Delta t'} \int_{t_i}^{t_i+\Delta t'} \left\{ \sin(2\pi f_s' \tau) \sin(2\pi \hat{f}_s \tau + \phi) d\tau \right\}$$

$$L(t_i + \Delta t') = \frac{1}{\Delta t'} \int_{t_i}^{t_i+\Delta t'} \left\{ \sin(2\pi f_s' \tau) \sin(2\pi \hat{f}_s \tau - \phi) d\tau \right\}$$

where:

$$f_s' = f_s + \Delta f_s = f_s + f_s \frac{\dot{R}}{c}$$

$$\hat{f}_s = f_s + \Delta \hat{f}_s(t_i) = f_s + f_s \frac{\dot{\hat{R}}}{c}$$

to calculate:

$$\frac{E-L}{E+L} \approx \frac{\sin(\phi)\pi}{\cos(\phi)} \left( \frac{\dot{R}}{c} - \frac{\dot{\hat{R}}(t_i)}{c} \right) = \pi \tan(\phi) \left( \frac{\dot{R}}{c} - \frac{\dot{\hat{R}}(t_i)}{c} \right)$$

$$\approx \pi \tan(\phi) \left\{ \frac{1}{\Delta t} \int_{t_i}^{t_i+\Delta t} \left( \frac{\dot{R}(\tau)}{c} - \frac{\dot{\hat{R}}(\tau)}{c} \right) d\tau \right\}$$

The timing based error signal 122 can be generated by:

$$y(t_i) = \frac{\tan(\phi)}{2\pi f_s} \left( \frac{E-L}{E+L} \right) \approx$$

$$\left\{ \frac{1}{\Delta t} \int_{t_i}^{t_i+\Delta t} \Delta \tau_d(\tau) d\tau \right\} + \frac{1}{2f_s} \left\{ \frac{1}{\Delta t} \int_{t_i}^{t_i+\Delta t} \left( \frac{\dot{R}(\tau)}{c} - \frac{\dot{\hat{R}}(\tau)}{c} \right) d\tau \right\} - n$$

where:

$$\Delta \tau_d(t) = d\_TOD + \frac{R(t)}{c} - \left( d\_TOD\_hat + \frac{\hat{R}(t)}{c} \right) + (f_c - \hat{f}_c)t$$

when t is time, $f_S$ is satellite synchronization signal frequency, $\dot{R}(\tau)$ is range rate, c is the speed of light, $\tau_d$ is a delay in transmitting the satellite synchronization signal 118 from space to the airborne platform 112.

The time and frequency estimation filter 106 generates the position correction signal 124 using the timing-based error signal 122, the range rate 120 and the range acceleration 128. In an embodiment, the time and frequency estimation filter 106 can be implemented as a Kalman filter to estimate the position of the airborne platform 112 from a previous position and a current measurement of a present position to compute an estimate of the current position. Alternatively, the time and frequency estimation filter 106 can be imple-mented as Kalman filter, an extended Kalman filter, a square-root filter, and the like.

The position correction signal 124 can be generated using the range rate 120, the range acceleration 128 and the timing-based error signal 122, where:

$$\hat{x}(t_i) = \phi \hat{x}(t_i - \Delta t) + \Gamma \frac{\ddot{\hat{R}}(t_i - \Delta t)}{c} + K_c(y(t_i) - H\hat{x}(t_i - \Delta t))$$

where $$\begin{bmatrix} x_1(t) \\ x_2(t) \end{bmatrix} = \begin{bmatrix} \Delta TOD + f_c t - \frac{R(t)}{c} \\ f_c - \frac{\dot{R}(t)}{c} \end{bmatrix} \quad y(t_i) - x_1(t_i) + \frac{1}{2f_s} x_2(t_i) + n(t_i)$$

$$\begin{bmatrix} \dot{x}_1 \\ \dot{x}_2 \end{bmatrix} = \begin{bmatrix} 0 & 1 \\ 0 & 0 \end{bmatrix} \begin{bmatrix} x_1 \\ x_2 \end{bmatrix} + \begin{bmatrix} 0 \\ 1 \end{bmatrix} \frac{\ddot{R}(t)}{c} + \begin{bmatrix} \omega_1 \\ \omega_2 \end{bmatrix}$$

$$\hat{x}(t_i) = \begin{bmatrix} \hat{x}_1(t_i) \\ \hat{x}_2(t_i) \end{bmatrix} \quad H = \begin{bmatrix} 1 & \frac{1}{2f_s} \end{bmatrix}$$

$$\phi = \begin{bmatrix} 1 & \Delta t \\ 0 & 1 \end{bmatrix}; \Gamma = \begin{bmatrix} \Delta t \\ \frac{\Delta t^2}{2} \end{bmatrix}$$

when $\ddot{R}$ is a line of sight range acceleration, $\Delta t$ is a time period between two adjacent satellite synchronization signals 118, c is the speed of light, and $K_c$ is the time-varying Kalman filter gain.

The time-varying Kalman filter gain $K_c$ can be generated by:

$$P^-(t_i) = \phi P^+(t_i - \Delta t)\phi^T + Q$$

$$K_c = \frac{P^-(t_i)H^T}{r}$$

$$P^+(t_i) = (I - K_c H)P^-(t_i)k$$

$$r = E(n^2(t_i))$$

$$Q = \begin{bmatrix} E(\omega_1^2) & 0 \\ 0 & E(\omega_2^2) \end{bmatrix}$$

Figure 2:
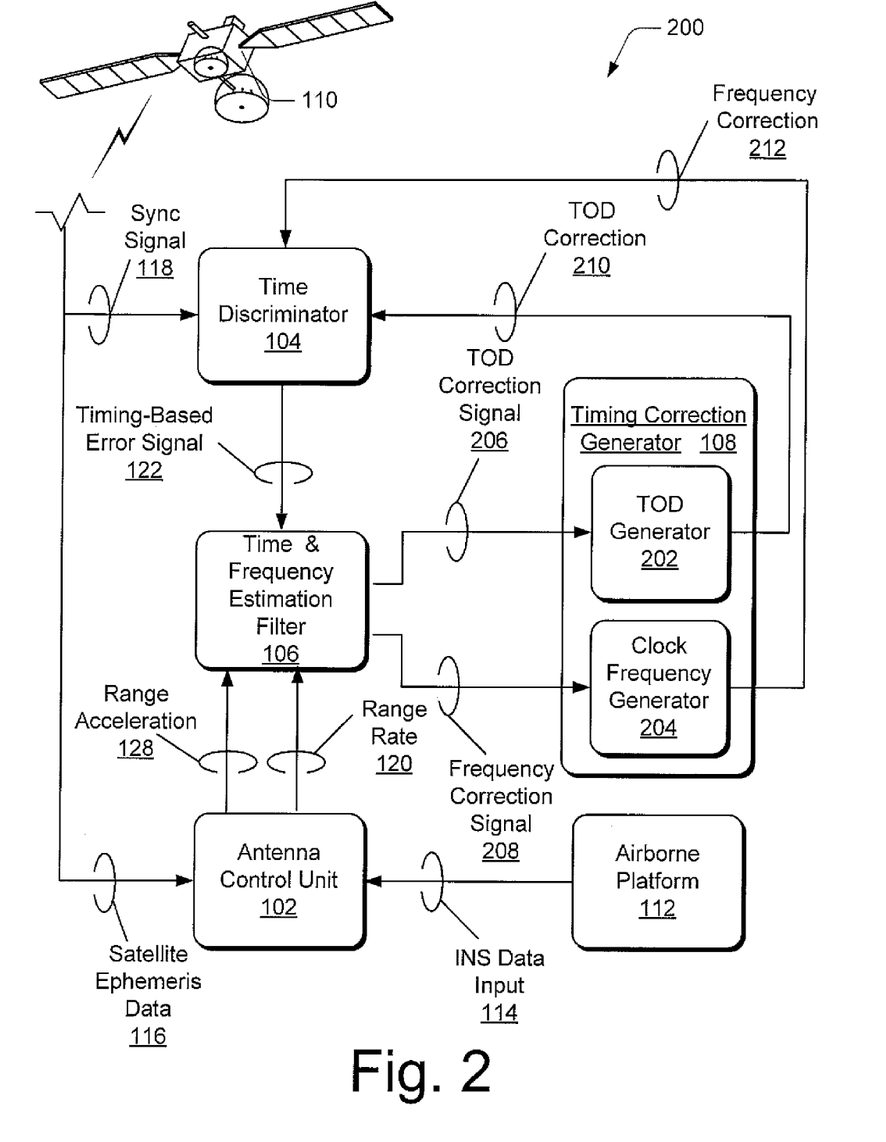
FIG. 2 illustrates another example system in which embodiments of time-of-day tracking with INS input can be implemented.

FIG. 2 further illustrates an example time-of-day tracking with INS input system 200 in which embodiments of time-of-day tracking with INS input can be implemented. The system 200 includes the antenna control unit 102, the time discriminator 104, the time and frequency estimation filter 106, and the timing correction generator 108 as described above with reference to FIG. 1 to synchronize the satellite 110 with the airborne platform 112.

In this example, the timing correction generator 108 includes a time-of-day generator 202 and a clock frequency generator 204. The time and frequency estimation filter 106 can generate a time-of-day correction signal 206 and a frequency correction signal 208 from the range rate 120, the range acceleration 128 and the timing-based error signal 122. The time-of-day generator 202 can receive the time-of-day correction signal 206 from the time and frequency estimation filter 106, and the clock frequency generator 204 can receive the frequency correction signal 208 from the time and frequency estimation filter 106. The time-of-day generator 202 can generate a time-of-day correction 210 from the time-of-day correction signal 206, and the clock frequency generator 204 can generate a frequency correction 212 from the frequency correction signal 208.

The time discriminator 104 can subsequently receive the time-of-day correction 210 and the frequency correction 212 to generate the timing-based error signal 122 until the satellite 110 and the airborne platform 112 are synchronized. The satellite 110 and the airborne platform 112 are approximately synchronized when the time-of-day correction 210 and frequency correction 212 achieve maximum signal power and when the timing-based error signal 122 equals approximately zero.

Generally, any of the functions and methods described herein can be implemented using hardware, software, firmware (e.g., fixed logic circuitry), manual processing, or any combination thereof. A software implementation represents program code that performs specified tasks when executed on a computing-based processor. Example method 300 described with reference to FIG. 3 may be described in the general context of computer executable instructions. Generally, computer executable instructions can include applications, routines, programs, objects, components, data structures, procedures, modules, functions, and the like that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices. Further, the features described herein are platform-independent such that the techniques may be implemented on a variety of computing platforms having a variety of processors.

Figure 3:
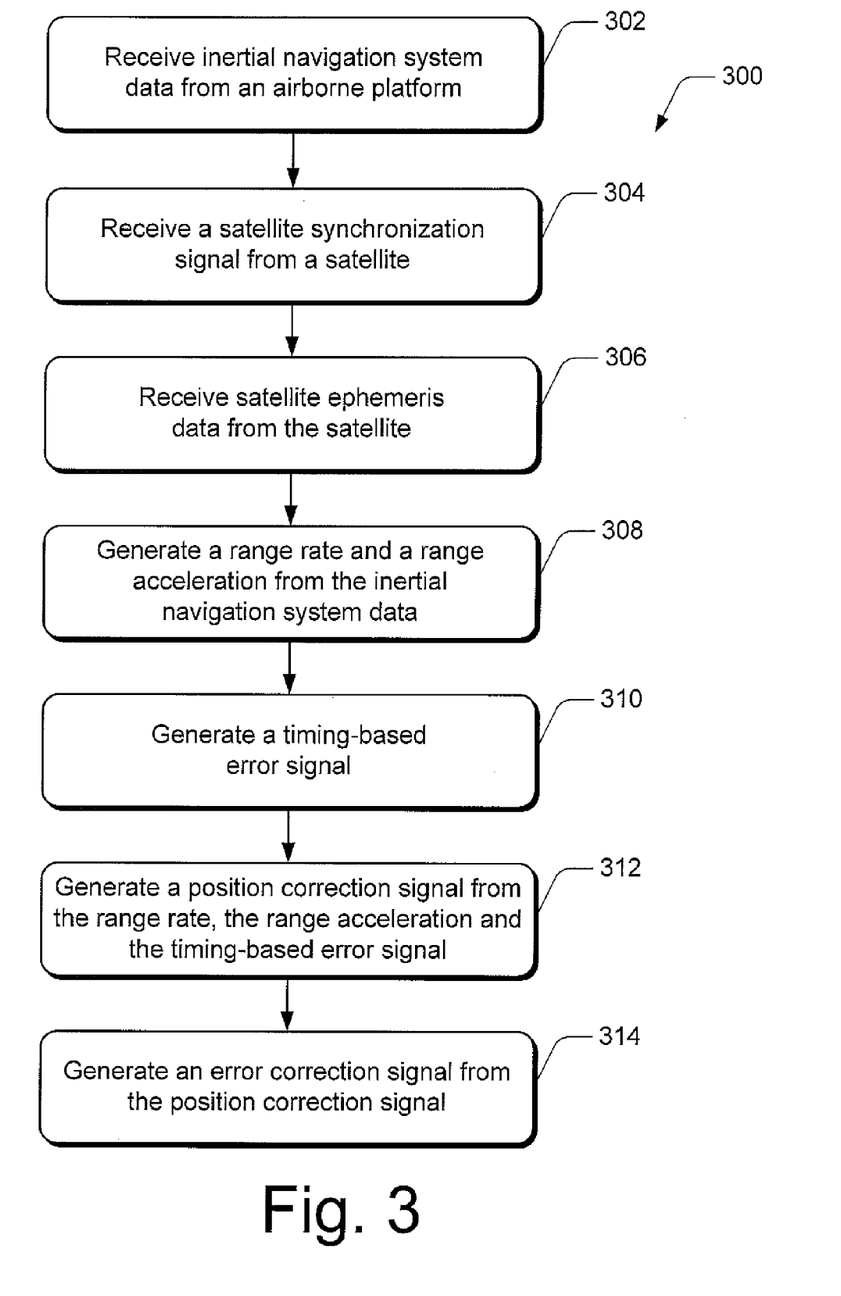
FIG. 3 illustrates exemplary method(s) for time-of-day tracking with INS input.

FIG. 3 illustrates an exemplary method 300 for time-of-day tracking with INS input and is described with reference to the exemplary systems shown in FIGS. 1 and 2. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 302, inertial navigation system data is received from an airborne platform. For example, the antenna control unit 102 receives the INS data input 114 from the airborne platform 112. At block 304, a satellite synchronization signal is received from a satellite. For example, the time discriminator 104 receives the satellite synchronization signal 118 from the satellite 110.

At block 306, satellite ephemeris data is received from the satellite. For example, the antenna control unit 102 receives the satellite ephemeris data 116 from the satellite 110. At block 308, a range rate and a range acceleration are generated from the inertial navigation system data. For example, the antenna control unit 102 generates the range rate 120 and the range acceleration 128 from the INS data 114. In an alternate embodiment, the antenna control unit 102 generates the range rate 120 and the range acceleration 128 from the INS data 114 and the satellite ephemeris data 116.

At block 310, a timing-based error signal is generated. For example, the time discriminator 104 initially generates the timing-based error signal 122 from the satellite synchronization signal 118. At block 312, a position correction signal is generated from the range rate, the range acceleration and the timing-based error signal. For example, the time and frequency estimation filter 106 generates the position correction signal 124 from the range rate 120, the range acceleration 128 and the timing-based error signal 122. In an embodiment, the position correction signal 124 includes a time-of-day correction signal 206 and a frequency correction signal 208.

At block 314, an error correction signal is generated from the position correction signal to synchronize the satellite with the airborne platform. For example, the timing correction generator 108 generates the error correction signal 126 from the position correction signal 124. In an embodiment, the timing correction generator 108 includes a time-of-day generator 202 and a clock frequency generator 204. The time and frequency estimation filter 106 generates the time-of-day correction signal 206 and the frequency correction signal 208 from the range rate 120, the range acceleration 128 and the timing-based error signal 122. The time-of-day generator 202 receives the time-of-day correction signal 206 from the time and frequency estimation filter 106, and the clock frequency generator 204 receives the frequency correction signal 208 from the time and frequency estimation filter 106. The time-of-day generator 202 generates a time-of-day correction 210 from the time-of-day correction signal 206, and the clock frequency generator 204 generates a frequency correction 212 from the frequency correction signal 208.

The method 300 can then continue at block 310 such that the timing-based error signal is generated from the error correction signal. For example, the time discriminator 104 generates an updated timing based error signal 122 using the error correction signal 126 received from the timing correction generator 108. At block 312, an updated position correction signal is generated from the range rate, the range acceleration and the updated timing-based error signal, and at block 314, an updated error correction signal is generated from the updated position correction signal to approximately (or precisely) synchronize the satellite with the airborne platform.

Figure 4:
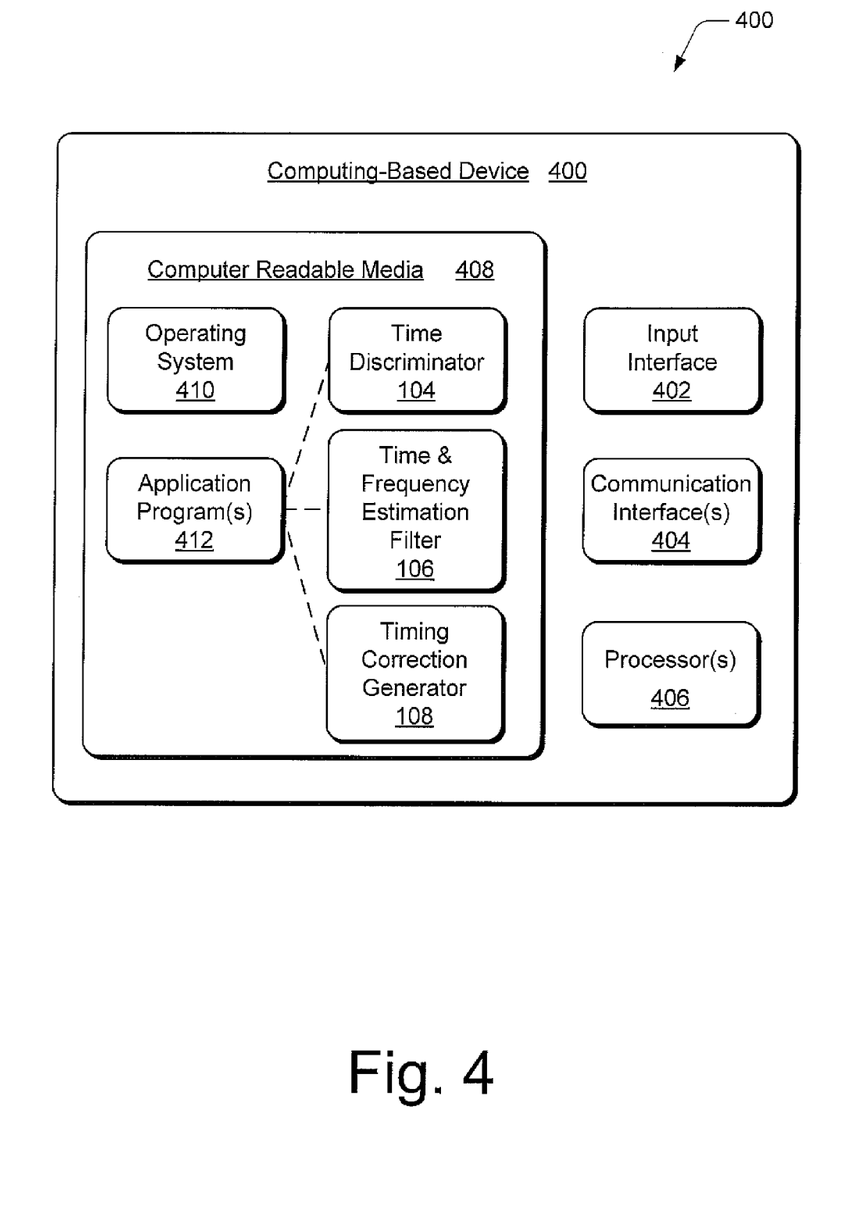
FIG. 4 illustrates an example computing-based device in which embodiments of time-of-day tracking with INS input can be implemented.

FIG. 4 illustrates an example computing-based device 400 which can be implemented as any form of computing or electronic device in which embodiments of time-of-day tracking with INS input can be implemented. For example, the computing-based device 400 can be implemented to include any one or combination of devices described with reference to the systems shown in FIGS. 1 and 2.

The computing-based device 400 includes an input interface 402 by which data inputs can be received. Device 400 further includes communication interface(s) 404 which can be implemented as any one or more of a serial and/or parallel interface, a wireless interface, any type of network interface, and as any other type of communication interface.

The computing-based device 400 also includes one or more processors 406 (e.g., any of microprocessors, controllers, and the like) which process various computer executable instructions to control the operation of computing-based device 400, to communicate with other electronic and computing devices, and to implement embodiments of time-of-day tracking with INS input. Computing-based device 400 can also be implemented with computer readable media 408, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 408 provides data storage mechanisms to store various information and/or data such as software applications and any other types of information and data related to operational aspects of computing-based device 400. For example, an operating system 410 and/or other application programs 412 can be maintained as software applications with the computer readable media 408 and executed on processor(s) 406 to implement embodiments of time-of-day tracking with INS input. For example, the time discriminator 104, the time and frequency estimation filter 106, and the timing correction generator 108 can each be implemented as a software application and/or component in various embodiments of time-of-day tracking with INS input.

In addition, although the time discriminator 104, time and frequency estimation filter 106, and timing correction generator 108 can each be implemented as separate application components, each of the components can themselves be implemented as several component modules or applications distributed to each perform one or more functions in a time-of-day tracking with INS input system. Further, any combination of the time discriminator 104, time and frequency estimation filter 106, and timing correction generator 108 can be implemented together as a single application program in an alternate embodiment.

Although embodiments of time-of-day tracking with INS input have been described in language specific to structural features and/or methods, it is to be understood that the subject of the appended claims is not necessarily limited to the specific features or methods described. Rather, the specific features and methods are disclosed as exemplary implementations of time-of-day tracking with INS input.

The invention claimed is:

1. A time-of-day tracking system, comprising:
an antenna control unit configured to receive inertial navigation system data from a first platform and generate a range rate and a range acceleration from the inertial navigation system data;
a time discriminator configured to receive a satellite synchronization signal from a satellite, and generate a timing-based error signal;
a time and frequency estimation filter configured to receive the range rate, the range acceleration and the timing-based error signal, the time and frequency estimation filter further configured to generate a position correction signal from the range rate, the range acceleration and the timing-based error signal; and
a timing correction generator configured to receive the position correction signal, and generate an error correction signal to at least approximately synchronize communication of the satellite with the first platform.

2. The time-of-day tracking system as recited in claim 1, wherein the antenna control unit is further configured to receive satellite ephemeris data from the satellite, and generate the range rate and the range acceleration from the satellite ephemeris data and the inertial navigation system data.

3. The time-of-day tracking system as recited in claim 1, wherein the time and frequency estimation filter includes a Kalman filter.

4. The time-of-day tracking system as recited in claim 1, wherein the time and frequency estimation filter generates the position correction signal which includes at least one of a time-of-day correction signal and a frequency correction signal.

5. The time-of-day tracking system as recited in claim 4, wherein the timing correction generator is configured to receive the at least one of the time-of-day correction signal and the frequency correction signal, and generate the error correction signal to at least approximately synchronize the satellite with the first platform.

6. The time-of-day tracking system as recited in claim 1, wherein the first platform comprises at least one of an airborne platform, a ground-based platform, a space-based platform, a water-based platform, and a hand-held device.

7. The time-of-day tracking system as recited in claim 1, wherein:
the timing correction generator includes a time-of-day generator and a clock frequency generator;
the error correction signal includes a time-of-day correction and a frequency correction;
the time-of-day generator is configured to receive the time-of-day correction signal and generate the time-of-day correction; and
the clock frequency generator is configured to receive the frequency correction signal and generate the frequency correction.

8. The time-of-day tracking system as recited in claim 1, wherein:
the error correction signal is configured for input to the time discriminator which is further configured to generate an updated timing-based error signal based on the error correction signal;
the time and frequency estimation filter is further configured to receive the updated timing-based error signal and generate an updated position correction signal; and
the timing correction generator is further configured to receive the updated position correction signal, and generate the error correction signal to at least approximately synchronize the satellite with the first platform.

9. The time-of-day tracking system as recited in claim 1, wherein the inertial navigation system data includes a position, a velocity, and motion indication of the first platform.

10. The time-of-day tracking system as recited in claim 1, wherein the time discriminator is further configured to at least one of advance the satellite synchronization signal and delay the satellite synchronization signal to compute the timing-based error signal.

11. The time-of-day tracking system as recited in claim 1, wherein the satellite and the airborne platform are at least approximately synchronized when the error correction signal achieves maximum signal power, and wherein the timing-based error signal equals zero.

12. A time-of-day tracking system, comprising:
an antenna control unit configured to receive inertial navigation system data from a moveable platform and generate a range rate and a range acceleration from the inertial navigation system data;
a time and frequency estimation filter configured to receive the range rate and the range acceleration and a timing-based error signal, the time and frequency estimation filter further configured to generate a time-of-day correction signal and a frequency correction signal from the range rate, the range acceleration and the timing-based error signal;
a time-of-day generator configured to receive the time-of-day correction signal and generate a time-of-day correction;
a clock frequency generator configured to receive the frequency correction signal and generate a frequency correction;

a time discriminator configured to receive a satellite synchronization signal from a satellite, the time-of-day correction from the time-of-day generator, and the frequency correction from the clock frequency generator, wherein:

the time discriminator initially generates the timing-based error signal from the satellite synchronization signal; and the time discriminator subsequently generates the timing-based error signal from the time-of-day correction and the frequency correction to at least approximately synchronize communication of the satellite with the moveable platform.

13. The time-of-day tracking system as recited in claim 12, wherein the antenna control unit is further configured to receive satellite ephemeris data from the satellite, and generate the range rate and the range acceleration from the satellite ephemeris data and the inertial navigation system data.

14. The time-of-day tracking system as recited in claim 12, wherein the satellite and the moveable platform are synchronized when the error correction signal achieves maximum signal power, and wherein the timing-based error signal equals zero.

15. A method, comprising:

receiving inertial navigation system data from a moveable platform;

generating a range rate and a range acceleration from the inertial navigation system data;

receiving a satellite synchronization signal from a satellite;

generating a timing-based error signal;

generating a position correction signal from the range rate and the range acceleration and the timing-based error signal; and generating an error correction signal from the position correction signal to synchronize communication of the satellite with the moveable platform.

16. The method as recited in claim 15, wherein the timing-based error signal is initially generated from the satellite synchronization signal, and wherein the timing-based error signal is subsequently generated from the error correction signal.

17. The method as recited in claim 15, further comprising:

generating an updated timing-based error signal from the error correction signal;

generating an updated position correction signal from the range rate, the range acceleration and the updated timing-based error signal; and generating an updated error correction signal from the updated position correction signal to synchronize the satellite with the moveable platform.

18. The method as recited in claim 15, wherein the position correction signal is generated to include a time-of-day correction signal and a frequency correction signal.

19. The method as recited in claim 18, wherein the error correction signal is generated from the time-of-day correction signal and a frequency correction signal to synchronize the satellite with the moveable platform.

20. The method as recited in claim 15, further comprising receiving satellite ephemeris data from the satellite, and wherein the range rate and the range acceleration is generated from the inertial navigation system data and the satellite ephemeris data.

* * * * *